3 Sheets--Sheet 1.
J. P. MANNY.
Harvester.
No. 6,383. Reissued April 13, 1875.
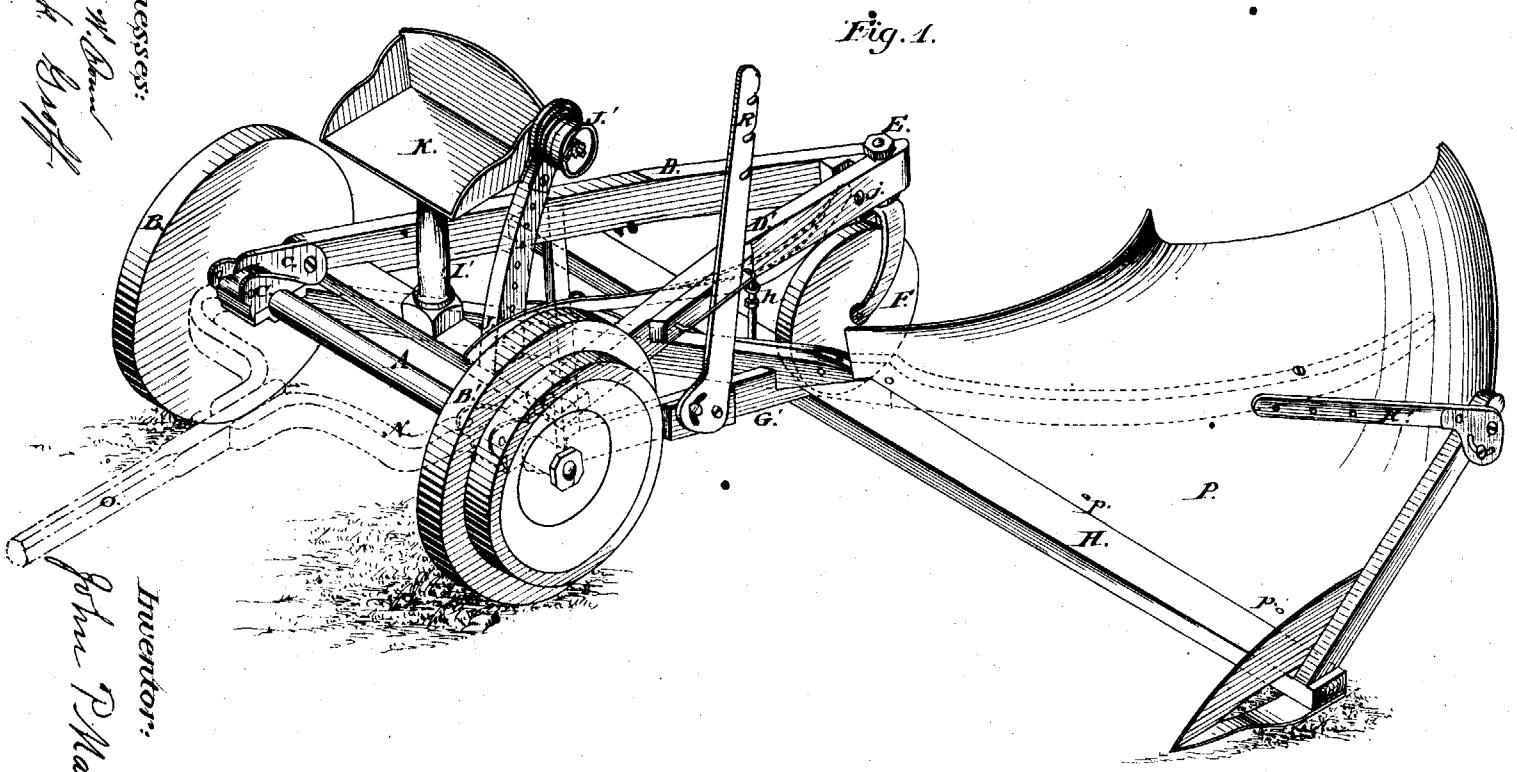
Witnesses:
Edw. W. Bond
Frank Groff.
Inventor:
John P. Manny
THE GRAPHIC CO. PHOTO-LITH. 39 & 41 PARK PLACE, N.Y.

3 Sheets--Sheet 2.
J. P. MANNY.
Harvester.
No. 6,383.
Reissued April 13, 1875.
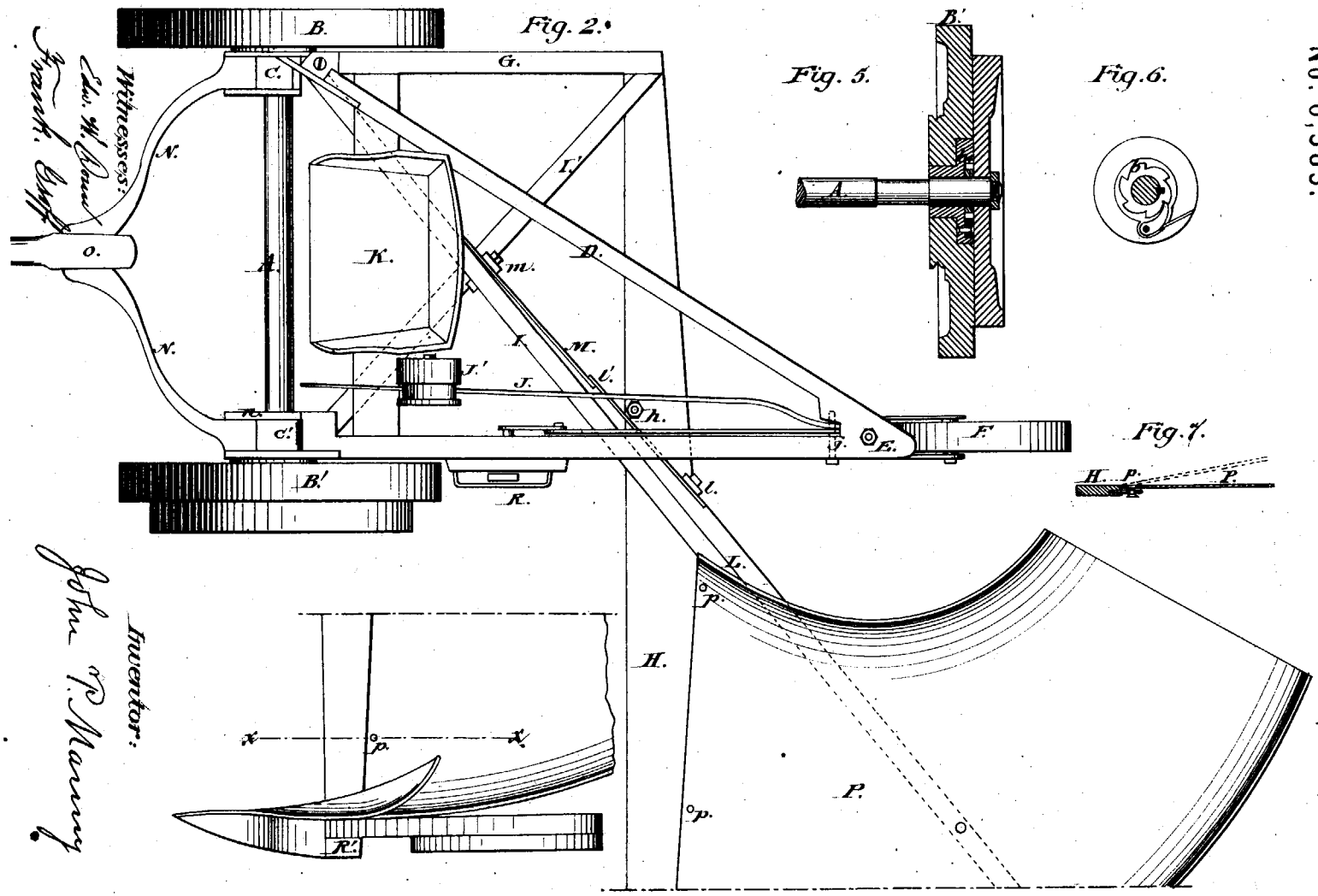
THE GRAPHIC CO. PHOTO.-LITH. 39 & 41 PARK PLACE, N.Y.

3 Sheets--Sheet 3.
J. P. MANNY.
Harvester.
No. 6,383. Reissued April 13, 1875.
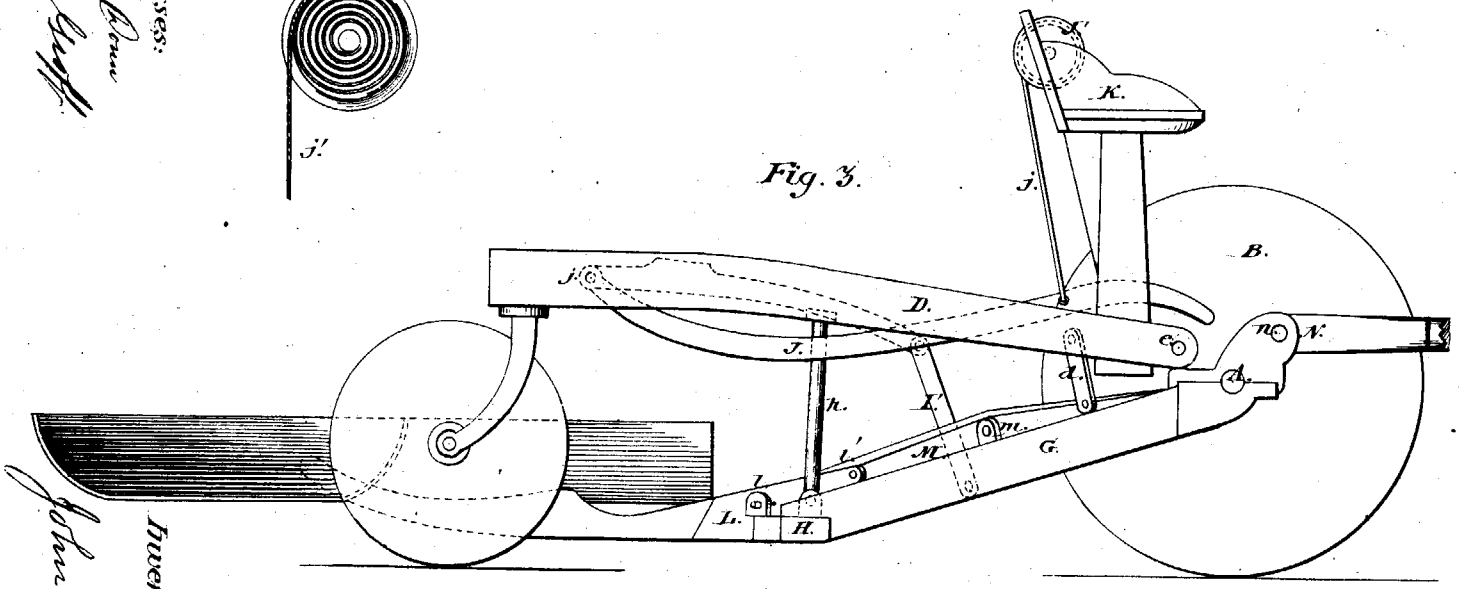
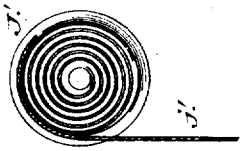
Fig. 4.
Witnesses:
Edw. W. Down
Frank Geoff
Inventor:
John P. Manny
THE GRAPHIC CO. PHOTO-LITH. 39 & 41 PARK PLACE, N.Y.

UNITED STATES PATENT OFFICE.

JOHN P. MANNY, OF ROCKFORD, ILLINOIS.

IMPROVEMENT IN HARVESTERS.

Specification forming part of Letters Patent No. 17,779, dated July 14, 1857; reissue No. 3,526, dated June 29, 1869; extended seven years; reissue No. 6,383, dated April 13, 1875; application filed April 9, 1875.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description:

The improvements constituting my invention relate to that class of harvesters which are provided with an upper carrying-frame and a lower adjustable frame, and which are mounted upon two main supporting-wheels, with the cutting-apparatus projecting laterally at one side of the main frame and the path of the main wheels.

Harvesting-machines for reaping grain, constructed with reels and a grain-platform, were well known prior to the date of the present invention. Mowing-machines had also been constructed provided with a finger-beam, but without a grain-platform, and of this class of harvesters the most approved kind were those in which the finger-beam and cutters had the capacity of rising and falling independently of the movements of the driver's platform, so as to conform freely to the undulations of the ground. Reaping-machines, of certain kinds, had also been made with detachable platforms, to adapt them to mowing.

The improvements herein described have reference to the construction of a harvester for reaping grain, the organization being such that, while useful for this purpose, it may also be transformed, as occasion may require, into a practical mowing-machine. The chief features aimed at in the construction of such a machine are the free undulation of the finger-beam in mowing, to enable the cutters to conform to the inequalities of the ground, and, when the machine is used for reaping, the capacity in the finger-beam of being raised and held at any desired and uniform height, (with freedom to rise above that height when encountering an obstacle,) the harmonious relation and co-operation of the reel with the grain-platform and the finger-beam being preserved whatever the elevation of the finger-beam may be. To this end my invention consists of certain new combinations of the following elementary members of reaping and mowing machines, viz: A main carrying-frame, supporting a seat for the driver or conductor of the machine, and carrying the finger-beam and connected parts, when the same are raised above the ground, as in reaping; two main running-wheels, to the axle of which the carrying-frame and its connected parts are attached in any convenient way, one or both of such wheels acting as drivers, to impart motion to the cutting-mechanism; a finger-beam for supporting the cutting apparatus, arranged to project laterally at one side of the carrying-frame and the main wheels; a platform attached to the finger-beams for receiving the cut grain; reel-supports for sustaining the reel by which the grain is pressed back toward the cutters and the platform, such reel-supports being so connected with the finger-beam as to partake of its vertical movements; a flexible or hinge connection between the finger-beam and the carrying-frame, whereby the finger-beam and the connected parts, while they are caused to move forward with the carrying-frame, have the capacity of rising and falling with the undulations of the ground independently of the vertical movements of such frame; a lifting-lever connected with the carrying-frame, by means of which, through suitable connections, the driver may regulate at pleasure the height above ground of the finger-beam; and the platform, reel-supports, and other parts connected therewith.

The combinations of these various members, which I regard as constituting my invention, are set forth in detail at the close of this specification. In order that they may be fully understood, I have represented in the accompanying drawings, and will proceed to describe, the principal parts of the machine in which I have embodied them, the parts omitted from the drawings being such as are well understood by builders of harvesters.

In the accompanying drawings, Figure 1 represents a view in perspective of so much of a harvester, embracing my improvements, as is necessary to illustrate the invention herein claimed, as seen from the divider side thereof. Fig. 2 represents a plan or top view of the same. Fig. 3 represents a view in elevation of the machine, as seen from the stubble side thereof, with the outer wheel removed. Fig. 4 is a view of the spring-drum for taking up a portion of the weight of the finger-beam. Fig. 5 is a vertical transverse section through one of the driving-wheels. Fig. 6 represents one of the backing-ratchets; and Fig. 7 represents a vertical section through the platform at the line *x x* of Fig. 2.

The carrying-frame in the machine here represented is composed of two pieces, D D′, and a strengthening cross-piece, which connects them near their forward end. This frame is supported at its forward end by attachment to the boxes C C′, in which the axle of the two driving-wheels B B′ revolves; and, at its rear end, by the caster-wheel F, which turns freely upon the spindle or pivot E. It will be seen that, by this construction, the relative position of the carrying-frame and the surface of the ground will be substantially maintained as the machine moves forward, whatever the inequalities of the ground may be. The driver's seat K is mounted upon this carrying-frame in a convenient position. Two main supporting-wheels, B B′, are constructed to turn freely upon their axle A, being also connected with it by suitable backing-ratchets *b*, as shown in Figs. 5 and 6, so that one or both of said wheels may operate to turn said axle, and thus drive the mechanism connected therewith. The finger-beam H projects laterally at the side of the carrying-frame and the path of the driving-wheels, so that it occupies the position relatively to them of the floating finger-beam of side-cut mowing-machines. Behind the finger-beam, and suitably connected therewith, is the grain-platform P. Reel-supports R R′ are provided for holding the shaft of an ordinary gathering-reel. These supports are pivoted at their lower ends, and provided with slots and set-screws, so that they can be adjusted forward and backward, as occasion may require.

In order that the finger-beam, the reel-supports, and the grain-platform may all be raised and lowered simultaneously relatively to the ground and to the carrying-frame, as required for reaping, the finger-beam is connected with the carrying-frame by a hinge connection. This hinge connection, in the machine represented in the drawings, is formed at the points where the upper frame is pivoted to the boxes C C′. As the lower frame, which consists of the bars G G′ and the diagonal braces I I′, is attached at its upper end to these same boxes, and the finger-beam is attached to the lower end of this lower frame, this construction permits the finger-beam to be adjusted vertically relatively to the carrying-frame, as desired. The inner reel-support, as shown in the drawings, is connected with the finger-beam through the intervention of the bar G′, and the outer reel-support through the intervention of a post secured to the divider end of the finger-beam. The grain-platform is secured to the finger-beam by means of hinges *p;* and thus, whenever the finger-beam is raised or lowered relatively to the upper carrying-frame, through the hinge-connection which unites the two, the reel-supports and the platform, being attached to or connected with the finger-beam, are raised or lowered to the same extent.

In order that the finger-beam, the grain-platform, and the connected parts may be suspended in reaping from the carrying-frame a suspension device, *h*, is provided, which is connected at its lower end with the finger-beam and at its upper end with the carrying-frame; and in order that the same device, which is so attached to the finger-beam as to constitute a yielding or flexible connection, may be used to raise and lower the finger-beam and the parts connected therewith its upper end is connected with the carrying-frame through the intervention of a lifting-lever, J. This lever is pivoted at its rear end to the carrying-frame, while its front end passes forward within reach of the driver on the seat K, so that he is enabled from his seat to raise and lower the finger-beam and the platform and the other parts connected therewith in reaping, or the finger-beam and the cutters in mowing. The finger-beam and connected members may be temporarily secured at any particular elevation to which they may be raised, by means of a standard arranged at the side of the driver's seat, and provided with a series of holes for the insertion of a retaining-pin under the lifting-lever, the front end of which traverses alongside this standard.

The effective length of the suspension device may be varied, if required, by means of the nut screwed upon its upper end above the eye upon the lifting-lever through which it passes. A second nut arranged upon this suspension device, below the lifting-lever, serves as a collar against which the lever may be made to bear whenever the driver finds it necessary to press down upon the cutting apparatus to hold it to the ground.

The horizontality of the platform during the vertical oscillations of the finger-beam is maintained by means of a lever, L, and its connections. This lever is pivoted to the finger-beam at *l*, and is connected at its forward end *l′* with one end of a second lever, M, which is pivoted to one of the diagonal braces of the lower adjustable frame, and has its other end connected with the upper carrying-frame by means of the link *d*.

As the lever L reaches under and is attached to the platform and the platform is connected with the finger-beam by hinges, this construction causes the platform to turn slightly upon its hinges as the finger-beam rises and falls, and thus its horizontality is preserved.

When the machine is to be used for mowing, in order to prevent its bearing too heavily upon the ground, and thus unduly increasing the draft, and to facilitate the lifting of the finger-beam, a portion of the weight of the finger-beam and connected parts is sustained by a coiled spring. For this purpose a stationary spring-drum, J′, is mounted upon a standard upon the carrying-frame. Through this drum passes a shaft upon which is mounted a pulley, turning freely thereon in one direction, but held from turning in the other by a pawl and ratchet. One end of a coiled spring is secured to the inner periphery of the drum, and the other end to the aforesaid shaft. A cord or chain connects the pulley with the lifting-lever J. By turning the shaft the spring may be wound up and held at any desired tension. The tension of this spring, acting through the lifting-lever and the suspension-device, reduces the pressure of the finger-beam upon the ground, while allowing the crop to be closely cut.

In the machine shown in the drawing the grain-platform is contracted at its delivery side so as to condense the gavel before it is discharged upon the stubble. The machine is drawn forward by means of the tongue O, which connects with the main frame of the machine by the hounds N N pivoted to the boxes C C′.

The object of thus making a hinge-connection between the pole and the carrying-frame, which, by consequence, has to be provided with a caster-wheel support at the rear, is to relieve the horses' necks, as far as possible, from the shock and strain that is apt to occur when the carrying-frame and pole are rigidly connected. It will be readily understood, however, that my invention in no wise relates to the mode in which these two parts are connected.

Various essential elements of a harvesting-machine, such as the cutters, the gearing, and other members, are not exhibited in the accompanying drawings, since the invention in no way relates to these omitted parts, and their construction is well understood by builders of this class of machines.

It will be seen that in a machine constructed as hereinbefore described, when it is desired to use the same for reaping, the finger-beam and the connected platform and reel-supports can be lifted up and sustained by the carrying-frame at any required distance from the ground, the construction being such that these various parts automatically maintain their relative adjustment and act harmoniously in relation to each other, whatever be the elevation they are made to assume, and, when the machine is used for mowing, the grain-platform being detached, the finger-beam with the cutters can be lowered upon the ground with the capacity of rising and falling with the undulations of the same, independently of the vertical movements of the carrying-frame, upon which the driver is mounted by reason of the flexible or hinge connection between the finger-beam and the upper or carrying frame. In this transformed condition the finger-beam projects laterally at one side of the carrying-frame and of the main driving-wheels, and, as there is no extension of the carrying-frame to the outer or grain end of the finger-beam, and, as the finger-beam is free to rise and fall with the undulations of the ground, with the capacity of being raised by the driver at pleasure to pass obstructions, the machine has the essential characteristics of an efficient side-cut mower.

What I claim as new, and as constituting my invention, is—

1. The combination, in a harvester, substantially as and for the purpose described, of two main wheels mounted upon the main axle, a main frame carrying the driver's seat and supporting the finger-beam when raised from the ground, a finger-beam projecting laterally at the side of the carrying-frame, and the path of the main wheels, a platform and reel-supports connected with such finger-beam and partaking of its vertical movements, and a hinge-connection between the finger-beam and the carrying-frame, whereby the finger-beam and its connected parts may be lifted to and held at any desired height in reaping.

2. The combination, substantially as set forth, in a two-wheeled harvester, of a laterally-projecting finger-beam vibrating about the main axle, with reel-supports and a platform, both vibrating in unison with the finger-beam.

JOHN P. MANNY.

Witnesses:

THOMAS C. CONNOLLY,
A. E. BEECHER.